(12) United States Patent
Madej et al.

(10) Patent No.: US 7,650,041 B2
(45) Date of Patent: Jan. 19, 2010

(54) SYSTEM AND METHOD FOR OPTICAL CHARACTER RECOGNITION IN AN IMAGE

(75) Inventors: Dariusz Madej, Shoreham, NY (US); Miroslav Trajkovic, Coram, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 706 days.

(21) Appl. No.: 11/361,477

(22) Filed: Feb. 24, 2006

(65) Prior Publication Data

US 2007/0201757 A1   Aug. 30, 2007

(51) Int. Cl.
*G06K 9/40* (2006.01)

(52) U.S. Cl. ............... 382/254; 345/612; 705/23

(58) Field of Classification Search ............... 345/612; 382/254, 317, 321; 705/23
See application file for complete search history.

(56) References Cited

U.S. PATENT DOCUMENTS

| | | | | |
|---|---|---|---|---|
| 5,157,736 A | * | 10/1992 | Boyer et al. | 382/113 |
| 5,631,984 A | * | 5/1997 | Graf et al. | 382/317 |
| 5,680,478 A | | 10/1997 | Wang et al. | |
| 5,751,855 A | * | 5/1998 | Saund | 382/224 |
| 5,818,978 A | | 10/1998 | Al-Hussein | |
| 6,233,353 B1 | * | 5/2001 | Danisewicz | 382/176 |
| 6,501,856 B2 | * | 12/2002 | Kuwano et al. | 382/194 |
| 7,043,078 B2 | * | 5/2006 | Guleryuz | 382/180 |

FOREIGN PATENT DOCUMENTS

| | | |
|---|---|---|
| EP | 0 621 554 | 10/1994 |
| EP | 0 702 320 | 3/1996 |
| GB | 2 230 633 | 10/1990 |
| WO | WO2007/100491 | 9/2007 |

OTHER PUBLICATIONS

International Search Report mailed Jul. 31, 2007 in related case PCT/US2007/003777.
International Preliminary Report on Patentability mailed Sep. 4, 2008 in related case PCT/US2007/003777.

* cited by examiner

*Primary Examiner*—Bhavesh M Mehta
*Assistant Examiner*—Gregory F Cunningham (57) ABSTRACT

Described is a system and method for optical character recognition in an image. The method comprising identifying a connected component in an image, computing at least one parameter for the connected component and selecting a portion of the image corresponding to the connected component for optical character recognition when the at least one parameter is within a predetermined threshold range.

20 Claims, 6 Drawing Sheets

SYSTEM AND METHOD FOR OPTICAL CHARACTER RECOGNITION IN AN IMAGE

FIELD OF THE INVENTION

The present invention relates generally to optical character recognition in images.

BACKGROUND

Optical character recognition (OCR) is a computer-based translation of an image of typewritten text into machine-editable text or a picture of characters into a standard encoding scheme. For example, a conventional OCR engine may be coupled to a flatbed scanner which scans a page of text or a picture. Because the page/picture is placed flush against a scanning face of the scanner, an image generated by the scanner typically exhibits even contrast and illumination, reduced skew and distortion, and high resolution. Thus, the OCR engine easily translates the text/picture in the image into the machine-editable text or the standard encoding scheme. When the image is of a lesser quality with regard to contrast, illumination, skew, etc., performance of the OCR engine may be degraded and the processing time may be increased due to processing of all pixels in the image. This may be the case when the image is generated by an imager-based scanner, because the text/picture is scanned from a distance, from varying orientations, and in varying illumination.

SUMMARY OF THE INVENTION

The present invention relates to a system and method for optical character recognition in an image. The method comprising identifying a connected component in an image, computing at least one parameter for the connected component and selecting a portion of the image corresponding to the connected component for optical character recognition when the at least one parameter is within a predetermined threshold range.

A system according to the present invention comprises an image capture device, a processor and an optical character recognition device. The image capture device captures an image. The processor identifies a connected component in an image and computes at least one parameter for the connected component. The processor selects a portion of the image corresponding to the connected component when the at least one parameter is within a predetermined threshold range. The optical character recognition device performs character recognition on the selected portion.

DETAILED DESCRIPTION

The present invention may be further understood with reference to the following description and the appended drawings, wherein like elements are referred to with the same reference numerals. The present invention describes a system and method for optical character recognition in an image. Those of skill in the art will understand that the term "optical character recognition" encompasses both optical and digital character recognition, and that use of the term "optical character recognition" or "OCR" encompasses any mechanism for translating images of text, pictures, graphics, etc. into machine-editable text and/or a standard encoding scheme.

Figure 1:
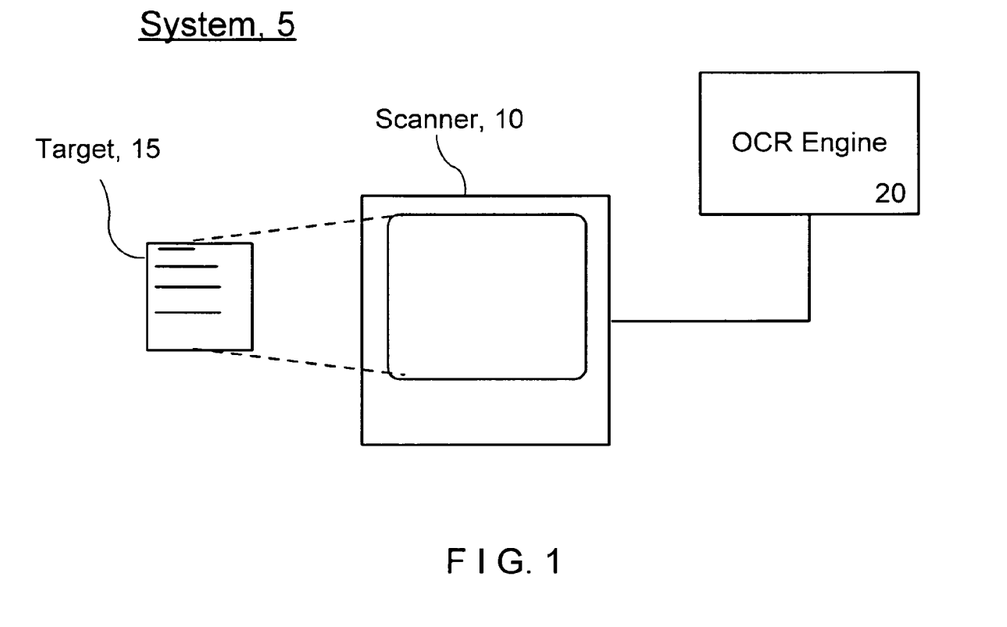
FIG. 1 shows an exemplary embodiment of a system for optical character recognition in an image according to the present invention.

FIG. 1 shows an exemplary embodiment of a system 5 for optical character recognition (OCR) in an image which includes a data capture arrangement (e.g., a scanner 10) generating an image of a target 15. The scanner 10 may be an imager-based scanner which utilizes a charge-coupled device as an image sensor to generate the image. The scanner 10 processes the image to generate input data, and transmits the input data to a processing arrangement (e.g., an OCR engine 20) for character recognition within the image. The processing performed by the scanner 10 allows the present invention to be utilized with a conventional OCR engine. However, those of skill in the art will understand that the processing may be executed at a stand-alone unit (e.g., a PC, server, laptop) or at the OCR engine 20. In another exemplary embodiment, the scanner 10 may be formed integrally with the OCR engine 20.

Variations in a scanning environment may affect attributes of the image generated by the scanner 10. For example, during a scan, an angle of the scanner 10 relative to the target 15 may produce variations in contrast across the image, skew and distortion. Lighting in the scanning environment and distance between the scanner 10 and the target 15 may contribute to uneven illumination of the target 15 and the varied contrast, producing a low-resolution image. When the target 10 includes indicia which are recognized in the OCR (e.g., character strings, graphical elements, bar codes, signatures, photographs, logos, etc.), the varying contrast, uneven illumination, skew, distortion and low-resolution may degrade the performance of the OCR engine 20. For example, the target 15 may be a label on a product, a receipt, a photograph, etc., mixed with or adjacent to text. According to the present invention, the image generated by the scanner 10 is processed to identify character strings in the image, extract only those portions of the image including the character strings and transmit the portions to the OCR engine 20 as input. The OCR engine 20 may recognize the portions as blocks containing a single string and/or on a character-by-character basis, and output the characters which are recognized within the image.

Figure 2:
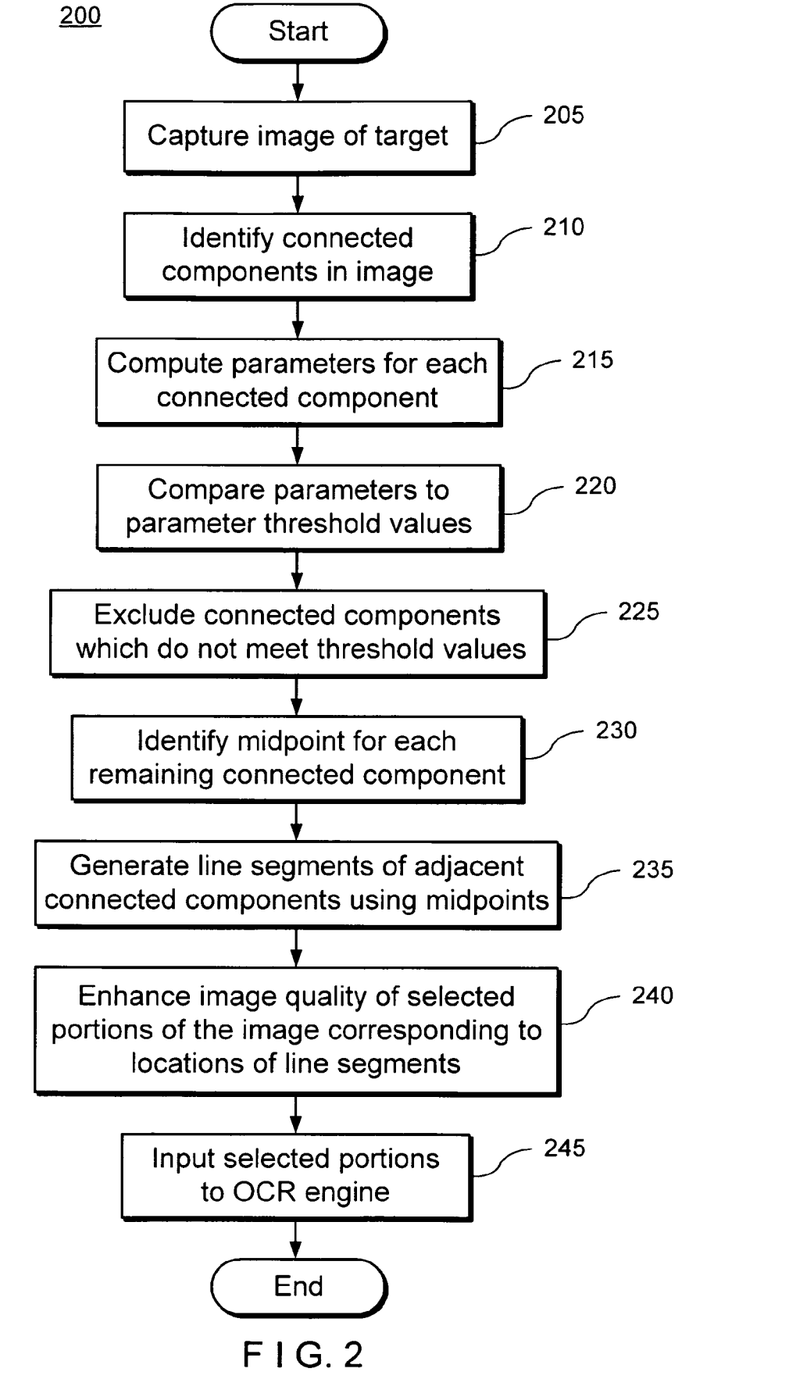
FIG. 2 shows an exemplary embodiment of a method for optical character recognition in an image according to the present invention.

FIG. 2 shows an exemplary embodiment of a method 200 for OCR in an image according to the present invention. The method 200 will be described with reference to the system 5 of FIG. 1 and a sequence of images shown in FIGS. 3a-3d. In step 205, the scanner 10 captures a first image 300 of the target 15. The image 300, shown in FIG. 3a, includes several character strings 305, a graphical element 310 and a region 315 that has been distorted and includes indiscernible text or characters (e.g., a bad copy, an area that has been blacked out, etc.). As known by those of skill in the art, the first image 300 may be one image in a series of images generated by the scanner 10 at a predetermined scan rate. Thus, the method 200 may be applied to each, or selected ones of the images in the series.

Figure 3A:
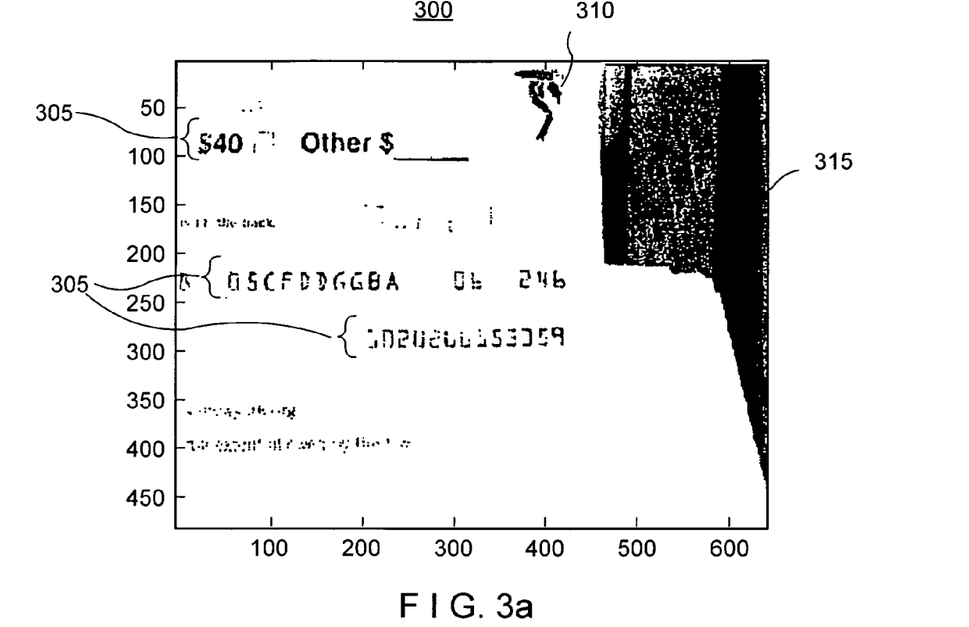
FIG. 3a shows an exemplary embodiment of an image captured by a scanner according to the present invention.

In step 210, connected components are identified in the first image 300 using, for example, a region growing algorithm. A connected component may be generally defined as two or more adjacent pixels which have substantially similar color. That is, the first image 300 generated by the scanner 10 may be a gray-scale image in which the pixels are either white, a shade of gray or black. Those of skill in the art will understand that the scanner 10 may generate a color image where each pixel is represented by three dots (red, green, blue, or luminance and two chrominance components) which converge on a same point, and that, in this embodiment, the first image 300 may be converted into a monochrome image prior to continuing with the method 200.

The region-growing algorithm detects connected pixels which are of substantially similar color to determine the presence of the connected component. In the exemplary embodiment of the region growing algorithm, a color histogram is generated to determine a color distribution throughout the color image and evaluate a binarization threshold dividing the color image into "light" and "dark" areas. Then, a first pixel having a color greater than a predetermined threshold value is selected. Colors of pixels adjacent the first pixel are compared to the predetermined threshold value to determine whether the first pixel and the adjacent pixel form a connected component. In other exemplary embodiments, a difference in the color of the first pixel and the colors of the adjacent pixels may be compared to a gradient value and/or color difference to determine whether the adjacent pixels are included in the connected component. When the region-growing algorithm has been iterated for each of, substantially all of, or selected ones of the pixels in the first image 300, the connected components for the entire first image 300 are identified. Thus, in the exemplary embodiment, the characters in the character strings 305, the graphical element 310 and the region 315 would be identified as a result of the region-growing algorithm. For example, in FIG. 3a, each digit in the character string "1020266153359" is a connected component.

In step 215, a set of one or more predetermined parameters is computed for each connected component. The parameters may include, but are not limited to, coordinates and a size of a bounding box around the connected component, a dominant direction of the connected component, coordinates of a center point of the connected component and a total size (in pixels) of the connected component. For example, the bounding box may be a predetermined shape, e.g., a rectangle, square, triangle, etc., which is selected based on the characters to be recognized. In the exemplary embodiment, the bounding box may be a rectangle which surrounds each connected component. That is, the digit "1" in the character string "1020266153359" is surrounded by a corresponding bounding box, while the subsequent digit "0" in the character string is surrounded by a further corresponding bounding box, which may not have a same size as the bounding box surrounding the "1." That is, the size of the bounding box is based on the size of the corresponding connected component.

In determining the other parameters, the center coordinates of the connected component may be determined using a center of the bounding box and/or a center of mass of the connected component. The total size in pixels of the connected component may be determined by summing a total number of pixels which have been identified as constructing the connected component. The dominant direction of the connected component, as understood by those of skill in the art, refers to a moment of the connected component. For example, with reference to the digit "1," an inertial axis is a vertical bisector thereof. The parameters may be computed for each connected component or selected ones of the connected components.

In step 220, the parameters for each connected component identified in the first image 300 are compared against parameter threshold values. The parameter threshold values may be determined based on, for example, a font, size, shape, image, etc. of the character to be recognized. That is, if the OCR engine 20 is used to recognize alphanumeric characters, various font types and character sizes may be used to determine a maximum bounding box size, a maximum number of pixels for the connected component and an expected dominant direction of the connection component. Those of skill in the art will understand that the parameter threshold values may be absolute or relative values, and that the threshold values may be embodied as ranges. For example, a range of bounding box sizes may be used to distinguish between characters/elements which are too small or not likely to be recognized by the OCR engine 20, characters/elements within the range, and characters/elements which are too large and would not correspond to recognizable characters/elements. The parameter threshold ranges may be useful for identifying, for example, elements attributable to noise and/or blur, and/or other artifacts in the first image 300.

Figure 3B:
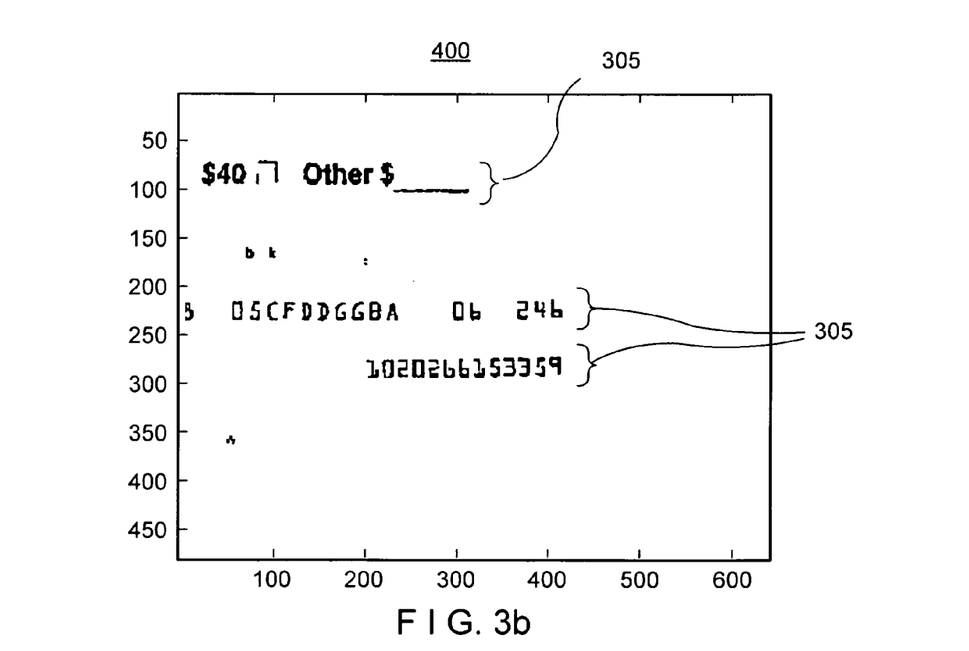
FIG. 3b shows an exemplary embodiment of the image of FIG. 3a after image processing according to the present invention.

In step 225, the connected components which do not comply with parameter threshold values are excluded from the first image 300 to generate a second image 400, as shown in FIG. 3b. Thus, the graphical element 310 and the region 315 have been excluded from the second image 400. Removing characters/elements from the first image 300 reduces an amount of data transmitted to the OCR engine 20, which reduces processing time and cycles.

Figure 3C:
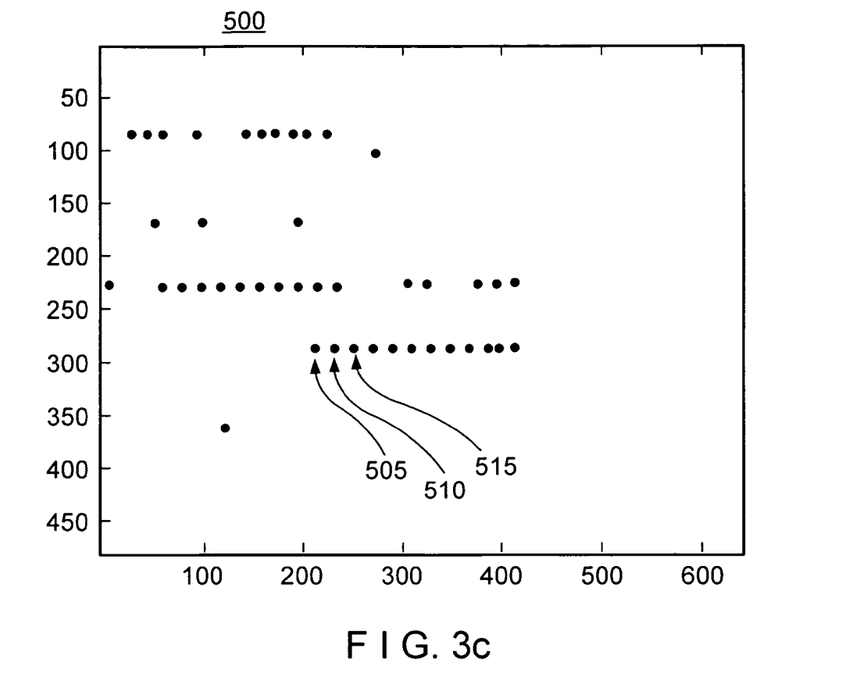
FIG. 3c shows an exemplary embodiment of midpoints of connected components in the image of FIG. 3b.

In step 230, a midpoint of each connected component is determined. In the exemplary embodiment, the midpoint of the connected component may be substantially similar to a center point of the bounding box surrounding the connected component. That is, the center point of the bounding box has X- and Y-coordinates which are used as the midpoint of the connected component. Alternatively, the midpoint of the connected component may be a center of inertia of the set of pixels comprising the connected component. In the exemplary embodiment, determining the midpoint of each connected component in the second image 400 yields a third image 500, as shown in FIG. 3c.

Figure 4:
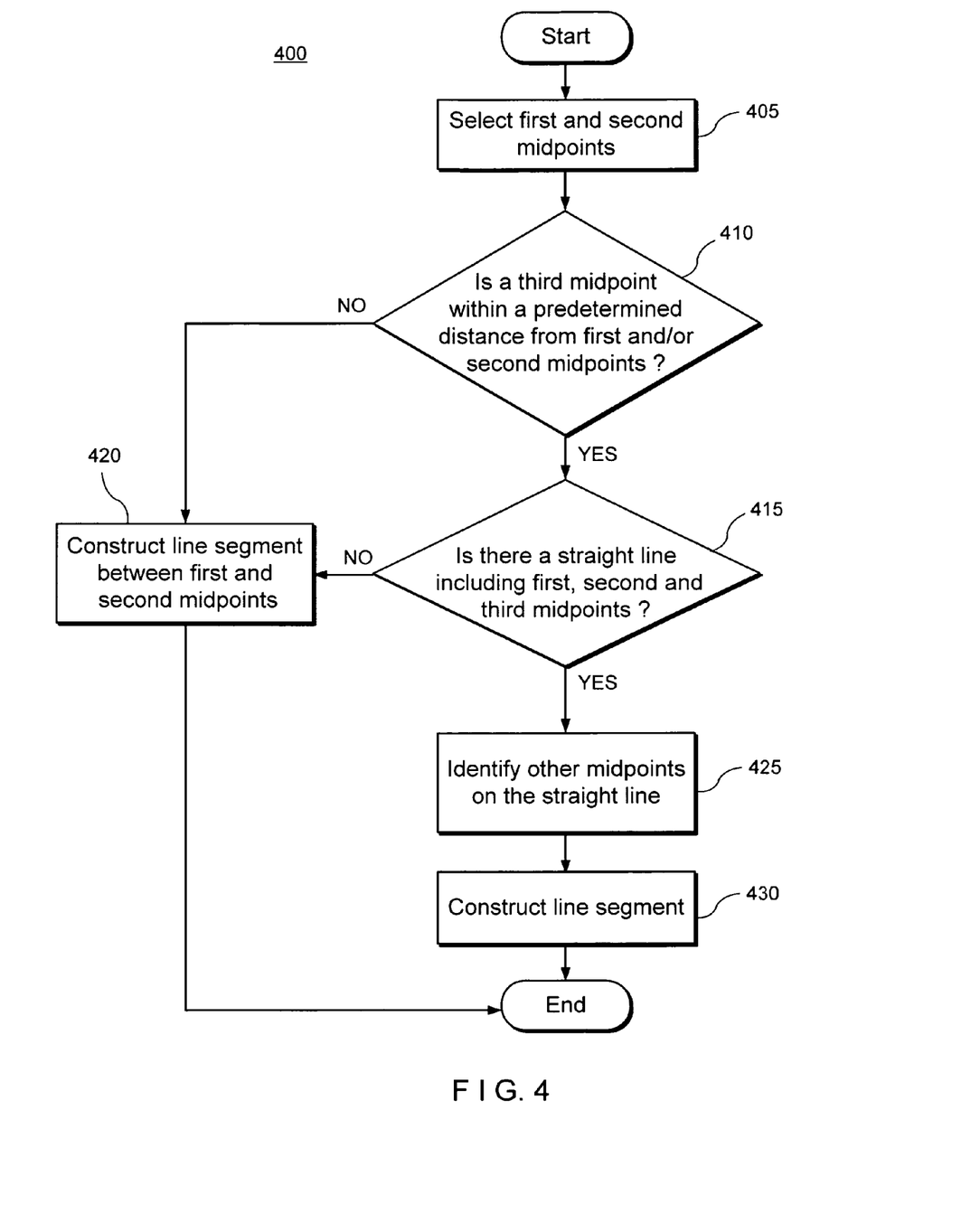
FIG. 4 shows an exemplary embodiment of a line-finding algorithm according to the present invention.

In step 235, line segments are identified in the third image 500 using the midpoints and a line-finding algorithm 400, as shown in FIG. 4. The line-finding algorithm 400 identifies a collinear string of two or more of the midpoints. In step 405, first and second midpoints 505 and 510, which are a predetermined distance from each other, are selected in the third image 500. The predetermined distance may be selected based on, for example, a maximum space (or acceptable range of space) between the characters/elements to be recognized. Those of skill in the art will understand that in an alternative exemplary embodiment, the line-finding algorithm may begin by selecting only the first midpoint 505 and, then, determine whether the second midpoint 510 is within the predetermined distance thereof. In this embodiment, the algorithm 400 may identify characters comprising only a single midpoint (e.g., a single digit, letter, etc.).

In step 410, it is determined whether there is a third midpoint within the predetermined distance from either the first and/or second midpoints 505 and 510. In the third image 500, a third midpoint 515 is detected within the predetermined distance from the second midpoint 510. Thus, the method 400 proceeds to step 415, where it is determined whether a straight (or substantially straight) line connects the midpoints 505-515. For example, a first straight line may connect the first and second midpoints 505 and 510. While the third midpoint 515 may not be located precisely on the first straight line (i.e., a second straight line between the second and third midpoints 510 and 515 may be angled relative to the first straight line), an offset of the third midpoint 515 from the first straight line is within a predetermined tolerance, indicating that the third midpoint 515 is assumed to lie on the first straight line for the purposes of the OCR processing.

When the third midpoint 515 is not within the predetermined distance from the first and/or second midpoints 505 and 510, or the third midpoint does not lie on the first straight line, a line segment is constructed comprising only the first straight line between the first and second midpoints 505 and 510, as shown in step 420.

When the first straight line extending through the first and second midpoints 205 and 210 includes the third midpoint 215, the algorithm 400 proceeds to step 425 and determines whether other midpoints lie on, or are within the predetermined tolerance, of the first straight line. In step 430, a line segment is constructed of a line extending between the first midpoint 205 and a last midpoint which lies on the first straight line as determined in step 425. The algorithm 400 is preferably iterated for each midpoint which is not part of a line segment, until all midpoints in the third image 500 have been analyzed. Coordinates of the line may be adjusted after each midpoint is added to the line, minimizing a square of distance between points and the line.

In an alternative exemplary embodiment, the line-finding algorithm 400 may utilize a Hough transform to locate the collinear strings of midpoints in the third image 500. The methodology of the Hough transform is more clearly set forth in U.S. Pat. No. 3,069,654, entitled "Method and Means for Recognizing Complex Patterns," the entire disclosure of which is expressly incorporated herein by reference. Those of skill in the art will understand that the present invention may similarly be utilized to locate a character string on a curved line. The Hough transform or any other curve-fitting method may be utilized to determine coordinates of a curved line and/or spline containing the midpoints.

Figure 3D:
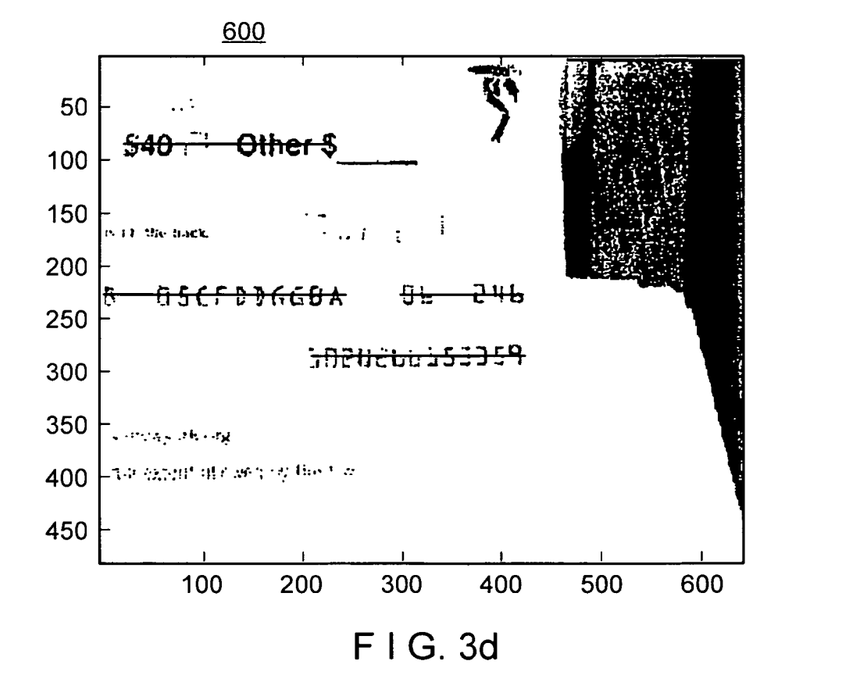
FIG. 3d shows an exemplary embodiment of line segments comprising the midpoints in the image of FIG. 3c according to the present invention.

Referring back to FIG. 2, the results of step 235 are shown in FIG. 3d, in which the line segments identified by the line-finding algorithm 400 are superimposed on the first image 300 generating a fourth image 600. At this point, portions of the first image 300 which include the character strings 305 are selected by identifying coordinates and orientations thereof. For example, by analyzing the bounding boxes for the connected components (or the first and last connected components) on the line segment over the character string "1020266153359," coordinates for a box surrounding the entire character string may be determined. Additionally, an angle of the line segment relative to X- and Y-axes of the first image 300 may be determined. The selected portions are extracted from the first image 300 and input to the OCR engine 20 for character recognition.

Figure 5A:
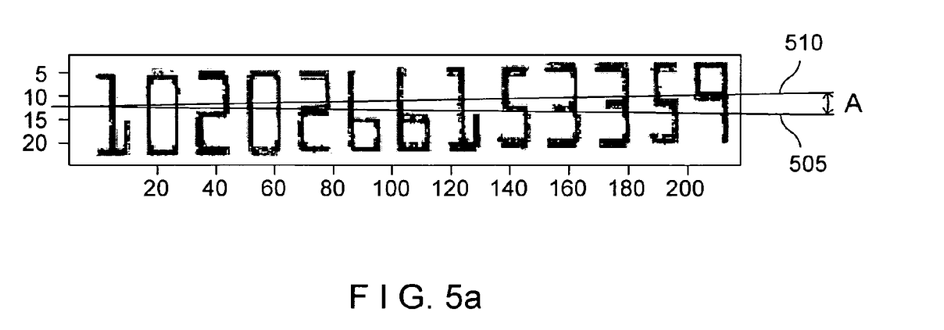
FIG. 5a shows an exemplary embodiment of a selected portion of the image of FIG. 3d.
Figure 5B:
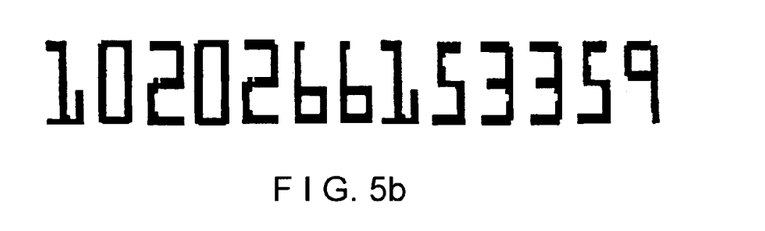
FIG. 5b shows an exemplary embodiment of the selected portion of FIG. 5a after image enhancement according to the present invention.

In optional step 240, the selected portions are enhanced to improve a quality of the first image 300 prior to input into the OCR engine 20. Enhancements provided to the selected portions include, but are not limited to, increasing image resolution, image binarization, image filtering and image rotation to align character strings vertically. For example, as shown in FIG. 5a, the connected components (e.g., digits) in the character string "1020266153359" are not aligned on a horizontal axis 505 parallel to the X-axis of the first image 300. An axis 510 of the character string is angled at an angle A relative to the horizontal axis 505, which is commonly referred to as a skew angle. As known by those of skill in the art, some conventional OCR engines discard objects which have a skew angle, either horizontally or vertically, outside of a predetermined range. Thus, if the present invention is used with such an OCR engine, the skew angle may be reduced to fit within the predetermined range. FIG. 5b shows a reduction in the skew angle A so that the axis 510 is substantially parallel with the X-axis of the first image 300. In an alternative exemplary embodiment, each connected component may be sent to the OCR engine separately after skew correction.

An exemplary method for increasing the image resolution may include up-sampling and interpolation using cubic splines as described in P. Vandewalle, S. Susstrunk, M. Vetterli, A Frequency Domain Approach to Super-Resolution Imaging from Aliased Low Resolution Images (May 4, 2004), the entire disclosure of which is expressly incorporated herein by reference. Another exemplary method may be based on an assumption about the characteristics of the color image, e.g., characters constructed from a piecewise elongated-shaped elements. During image binarization, a pixel color threshold may be determined and used to adjust the color of the pixels. For example, when a color of a selected pixel is below the pixel color threshold, the pixel may be adjusted to be white. When the color of the selected pixel is equal to or above the pixel, the pixel may be adjusted to black. As understood by those of skill in the art, when processing several connected components rather than the entire color image (or first image 300), the pixel color threshold may be identified more robustly. Moreover, the pixel color threshold may be optimized after each connected component is processed to enhance the binarization. In addition, outlines of the connected components may be smoothed using, for example, a directional median filtering.

In step 245, the selection portions of the first image 300 (optionally enhanced) are input as the input data to the OCR engine 20 for character recognition which may be accomplished as is conventionally known, e.g., optically and/or digitally.

It will be apparent to those skilled in the art that various modifications may be made in the present invention, without departing from the spirit or scope of the invention. Thus, it is intended that the present invention cover the modifications and variations of this invention provided they come within the scope of the appended claims and their equivalents.

What is claimed is:

1. A method, comprising:
   capturing an image with an imager-based scanner;
   identifying a connected component in the image;
   computing at least one parameter for the connected component;
   determining a midpoint of the connected component; and
   selecting a portion of the image corresponding to the connected component for optical character recognition when the at least one parameter is within a predetermined threshold range and based on the midpoint.

2. The method according to claim 1, wherein the identifying includes:
   selecting a set of pixels within the image which have a substantially similar color and are in contact with at least one pixel in the set; and
   forming the connected component from the set of pixels.

3. The method according to claim 1, wherein the connected component is one of an alphanumeric figure, a picture, a graphical element and a signature.

4. The method according to claim 1, wherein the at least one parameter includes at least one of (i) coordinates of a bounding box around the connected component, (ii) a size of the bounding box, (iii) a dominant direction of the connected component, (iv) a center point of the connected component and (v) a size of the connected component.

5. The method according to claim 1, further comprising:
when the at least one parameter is outside of the predetermined threshold range, excluding the portion of the image corresponding to the connected component from the optical character recognition.

6. The method according to claim 1, further comprising:
identifying a further connected component in the image;
determining a further midpoint of the further connected component; and
when the midpoint is within a predetermined distance of the further midpoint, constructing a line segment between the midpoint and the further midpoint.

7. The method according to claim 6, further comprising;
selecting a further portion of the image corresponding to the connected components whose midpoints lie within a predetermined tolerance of the line segment for the optical character recognition.

8. The method according to claim 6, further comprising:
identifying a collinear string of the midpoint and the further midpoint in the image using a Hough transform.

9. The method according to claim 7, further comprising:
executing at least one predetermined action on the further portion of the image prior to the optical character recognition, the at least one predetermined action being at least one of, (i) increase image resolution, (ii) image binarization, (iii) image filtering and (iv) image rotation to align the connected components.

10. A system, comprising:
an image capture device capturing an image;
a processor identifying a connected component in an image and computing at least one parameter for the connected component, determining a midpoint of the connected component, the processor selecting a portion of the image corresponding to the connected component when the at least one parameter is within a predetermined threshold range and based on the midpoint; and
an optical character recognition device performing character recognition on the selected portions.

11. The system according to claim 10, wherein the processor selects a set of pixels within the image which have a substantially similar color and are in contact with at least one pixel in the set and forms the connected component from the set of pixels.

12. The system according to claim 10, wherein the connected component is one of an alphanumeric figure, a picture, a graphical element and a signature.

13. The system according to claim 10, wherein the at least one parameter includes at least one of (i) coordinates of a bounding box around the connected component, (ii) a size of the bounding box, (iii) a dominant direction of the connected component, (iv) a center point of the connected component and (v) a size of the connected component.

14. The system according to claim 10, wherein, when the at least one parameter is outside of the predetermined threshold range, the processor excludes the portion of the image corresponding to the connected component.

15. The system according to claim 10, wherein the processor identifies a further connected component in the image and determines a further midpoint of the further connected component, the processor constructing a line segment between the midpoint and the further midpoint when the midpoint is within a predetermined distance of the further midpoint.

16. The system according to claim 15, wherein the processor selects a further portion of the image corresponding to the connected components whose midpoints lie within a predetermined tolerance of the line segment, the processor transmitting the further portion to the optical character recognition device.

17. The method according to claim 16, wherein the processor identifies a collinear string of the midpoint and the further midpoint in the image using a Hough transform.

18. The system according to claim 17, wherein the processor executes at least one predetermined action on the further portion of the image prior to transmission to the optical character recognition device, the at least one predetermined action being at least one of, (i) increase image resolution, (ii) image binarization, (iii) image filtering and (iv) image rotation to align the connected components.

19. An apparatus, comprising:
an image capture means for capturing an image;
a processing means for identifying a connected component in an image, computing at least one parameter for the connected component, and determining a midpoint of the connected component, the processing means for selecting a portion of the image corresponding to the connected component when the at least one parameter is within a predetermined threshold range and based on the midpoint; and
a character recognition means for performing character recognition on the selected portion.

20. A computer-readable storage medium storing a set of instructions, the set of instructions capable of being executed by a processor, the set of instructions performing the steps of:
identifying a connected component in an image;
computing at least one parameter for the connected component; and
determining a midpoint of the connected component; and
selecting a portion of the image corresponding to the connected component for optical character recognition when the at least one parameter is within a predetermined threshold range and based on the midpoint.

* * * * *